United States Patent
Ruger

Patent Number: 5,401,042
Date of Patent: Mar. 28, 1995

[54] CART BASE WITH ANTI-STORAGE TRUSS

[75] Inventor: Verlyn C. Ruger, Bellevue, Mich.

[73] Assignee: United Steel & Wire Company, Battle Creek, Mich.

[21] Appl. No.: 188,099

[22] Filed: Jan. 28, 1994

[51] Int. Cl.$^6$ ............................................. B62B 11/00
[52] U.S. Cl. ......................... 280/33.997; 280/33.991; 280/DIG. 4
[58] Field of Search .................. 280/33.991, 33.992, 280/33.995, 33.997, DIG. 3, DIG. 4, 79.3; 224/42.41, 42.42

[56] References Cited

U.S. PATENT DOCUMENTS

| | | | |
|---|---|---|---|
| D. 155,971 | 11/1949 | Concklin | 280/33.997 |
| D. 190,279 | 5/1961 | Hummer | 280/33.991 |
| 3,829,114 | 8/1974 | Cohen et al. | 280/33.991 |
| 3,931,984 | 1/1976 | Young | 280/33.991 |
| 4,084,832 | 4/1978 | Upshaw | 280/DIG. 4 |
| 4,335,892 | 6/1982 | Berlin | 280/33.997 |
| 4,519,622 | 5/1985 | Levy-Joseph | 280/DIG. 4 |

FOREIGN PATENT DOCUMENTS 2488561 2/1982 France ................. 280/DIG. 4

Primary Examiner—Margaret A. Focarino
Assistant Examiner—Anne Marie Boehler
Attorney, Agent, or Firm—Flynn, Thiel, Boutell & Tanis

[57] ABSTRACT

A wheeled nestable shopping cart having a wheeled base on which an upwardly-opening shopping basket is fixedly mounted. A handle is fixedly positioned adjacent the rear end of the basket. The base is formed primarily by three one-piece U-shaped rearwardly opening members. The first U member defines a base frame and mounts casters adjacent the front or bight end thereof, and rear wheels adjacent the free ends of the side legs. The second U member has an elevated U-shaped portion which directly supports the bottom wall of the basket adjacent the rear end thereof, and has rear leg portions which project down and rigidly secure to the side legs of the base frame adjacent the rear ends thereof. The third U member functions to provide vertical load support between the first and second members, and to prevent storage of goods on the base. This third U member includes a pair of sidewardly-spaced truss members which include vertical load support braces which extend directly between the first and second members, and forwardly and downwardly inclined front braces which connect adjacent the front bight of the base and prevent storage of goods on the base.

10 Claims, 4 Drawing Sheets

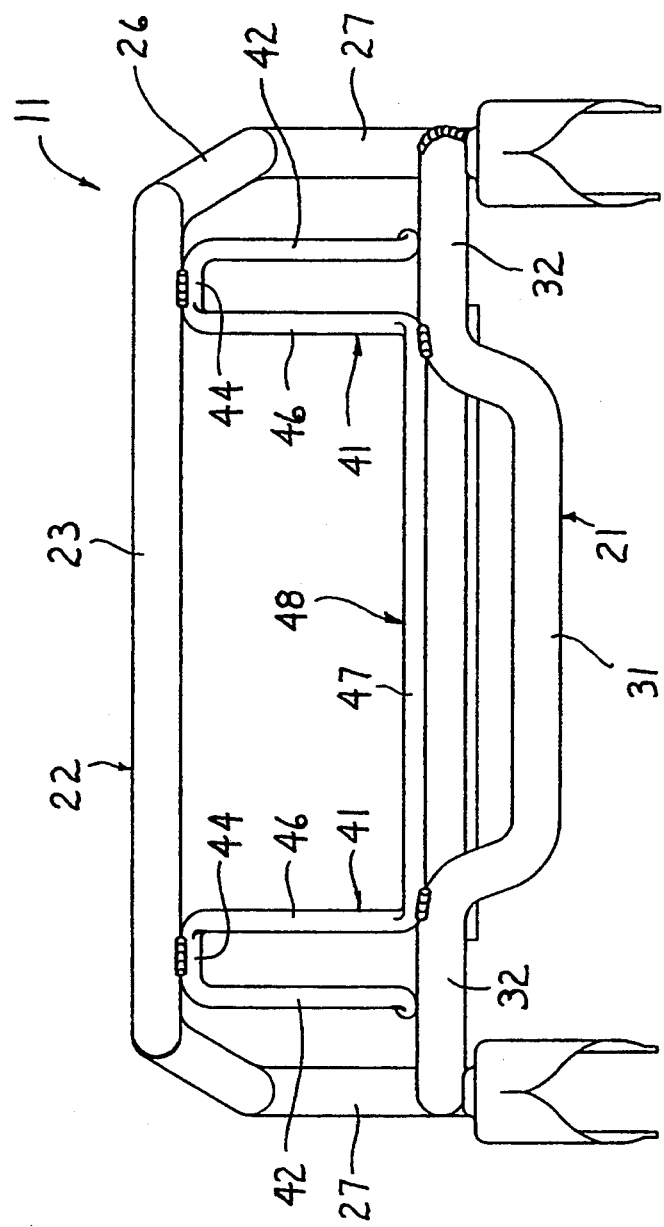

CART BASE WITH ANTI-STORAGE TRUSS

FIELD OF THE INVENTION

This invention relates to an improved base or underframe for a nestable shopping cart, which base is constructed to prevent storage of goods thereon.

BACKGROUND OF THE INVENTION

Pilferage of goods from supermarkets and department stores is a major cause of economic loss. Since the baskets of shopping carts are usually maintained spaced above the wheeled portion of the cart's base, the region below the shopping cart basket naturally lends itself to storage of merchandise that can be overlooked by checkout personnel.

In recognition of this long-standing problem, U.S. Pat. No. 3,829,114, discloses one attempt to frustrate use of the region below the cart basket to prevent pilferage. According to the structure of this patent, the wheeled portion of the cart base is provided with a plurality of upwardly inclined struts functioning as obstructions, which struts are added to the standard base of existing carts. While the structure of this patent has been commercially utilized on shopping carts and has proven at least somewhat successful in minimizing pilferage, nevertheless the utilization of additional inclined struts in the manner suggested by this patent is undesirable since these struts perform no other significant function and thus add to the cost of the cart, and result in the cart having an undesirable U.S. Pat. No. 4,084,832 illustrates a further attempt at minimizing the pilferage problem by providing a cart base which attempts to minimize storage of goods thereon. The base of this latter patent has also been commercially utilized and, while it does minimize pilferage, nevertheless even this base is of less than optimum design in view of the additional manufacturing steps and hence expense involved. More specifically, the undercarriage or base disclosed in this patent utilizes two U-shaped tubular members, a first of which functions in a conventional manner as the basket support and as the terminals for the rear wheels, and the second of which supports the front casters and has leg portions formed in an inverted V-shape, the apex of which is welded to the basket support. Due to the rather complex configuration of the second U-shaped member, including the substantial number of bends and the required number of welded connections between the two U-shaped members (coupled with the additional welded reinforcement associated with each V-shaped portion of the second member), the overall manufacture and assembly of this base is rather time consuming and expensive.

U.S. Pat. No. 4,335,892 illustrates another prior attempt to minimize the pilferage problem by providing a cart base which minimizes storage of goods thereon. In the base of the cart shown in this latter patent, the base has a one-piece U-shaped tubular element which defines the front bight of the base, with the legs projecting rearwardly and upwardly therefrom for securement adjacent the upper ends of the rear upright legs. This arrangement, however, is difficult to provide both desirable manufacturing techniques and desirable structural strength.

Still other attempts to provide shopping carts having anti-pilferage structural characteristics associated with the cart base are illustrated by U.S. Pat. Nos. 4,519,622 and 3,931,984.

Thus, it is an object of the present invention to provide an improved base or underframe construction for a nestable shopping cart which overcomes many of the disadvantages which have been experienced with known constructions.

More specifically, it is an object of this invention to provide an improved base, as aforesaid, which is effective in minimizing or preventing storage of goods thereon so as to assist in reducing loss of goods due to pilferage, which also provides highly desirable strength characteristics so as to result in the overall cart having desired strength and rigidity, and which significantly improves the manufacture of the cart so as to improve the overall cart quality and reduce manufacturing cost.

A further object is to provide an improved base for a shopping cart, as aforesaid, which provides the above characteristics and at the same time provides the cart with a desirable appearance.

These and other objects of the invention are accomplished by the simplified base construction of the present invention without interfering with, and in fact improving, the desired strength and rigidity of the cart while still retaining the desired nestability of the cart with other like carts.

Briefly summarizing the present invention according to a preferred embodiment, same comprises a shopping cart having an improved base so that the cart retains its ability to nest with other like carts. The base provides improved and simplified construction that has both nesting and storage-preventing characteristics, while providing the base with highly desirable strength and rigidity, as well as manufacturing convenience. The improved base is formed primarily by two conventional U-shaped tubular members which are rigidly joined by storage-preventing braces disposed adjacent opposite sides of the base. The one U-shaped member has a bight and adjacent leg portions arranged generally planar and approximately horizontal so as to permit a basket to be supported directly thereon, with the portions of the legs that are distal from the bight being formed to extend downwardly to define laterally spaced upright legs, the lower ends of which are joined to rear wheel assemblies. The second U-shaped member is disposed more closely adjacent the floor and is spaced upwardly therefrom by the front and rear wheels of the cart. The bight of the second member defines the front end of the base, and opposite ends of the bight join to generally elongate side legs which project generally horizontally rearwardly in diverging relationship for nestability, with rear ends of these side legs being fixedly joined to the upright rear legs adjacent the rear wheels. A storage-preventing brace is disposed adjacent each side of the base, which brace includes an upright brace element which extends generally vertically between one end of the basket-supporting bight and the lower side leg, with this upright brace element having opposite ends thereof fixedly joined, as by welding, to the basket support bight and respective side leg. Each storage preventing brace also includes an angled brace portion which has one end fixed to the basket-supporting bight in the vicinity of the end thereof, with this angled brace projecting forwardly and downwardly so that the other end is fixedly secured to the U-shaped base member in the vicinity of the end between the bight and side leg. The angled brace portion and the upright brace member are preferably defined by a single member which is suitably bent into an inverted V-shaped form from suitable metal rod. In the illustrated embodiment, the two sidewardly-spaced braces are preferably formed from a single elongate metal rod, which formation includes a bight portion which is joined to and extends generally transversely between the forward ends of the angled brace portions.

Other objects and purposes of the invention will be apparent to persons familiar with carts of this general type upon reading the following specification and inspecting the accompanying drawings.

BRIEF DESCRIPTION OF THE DRAWINGS

FIG. 4 is a front elevational view of the base shown in FIG. 2.

Figure 1:
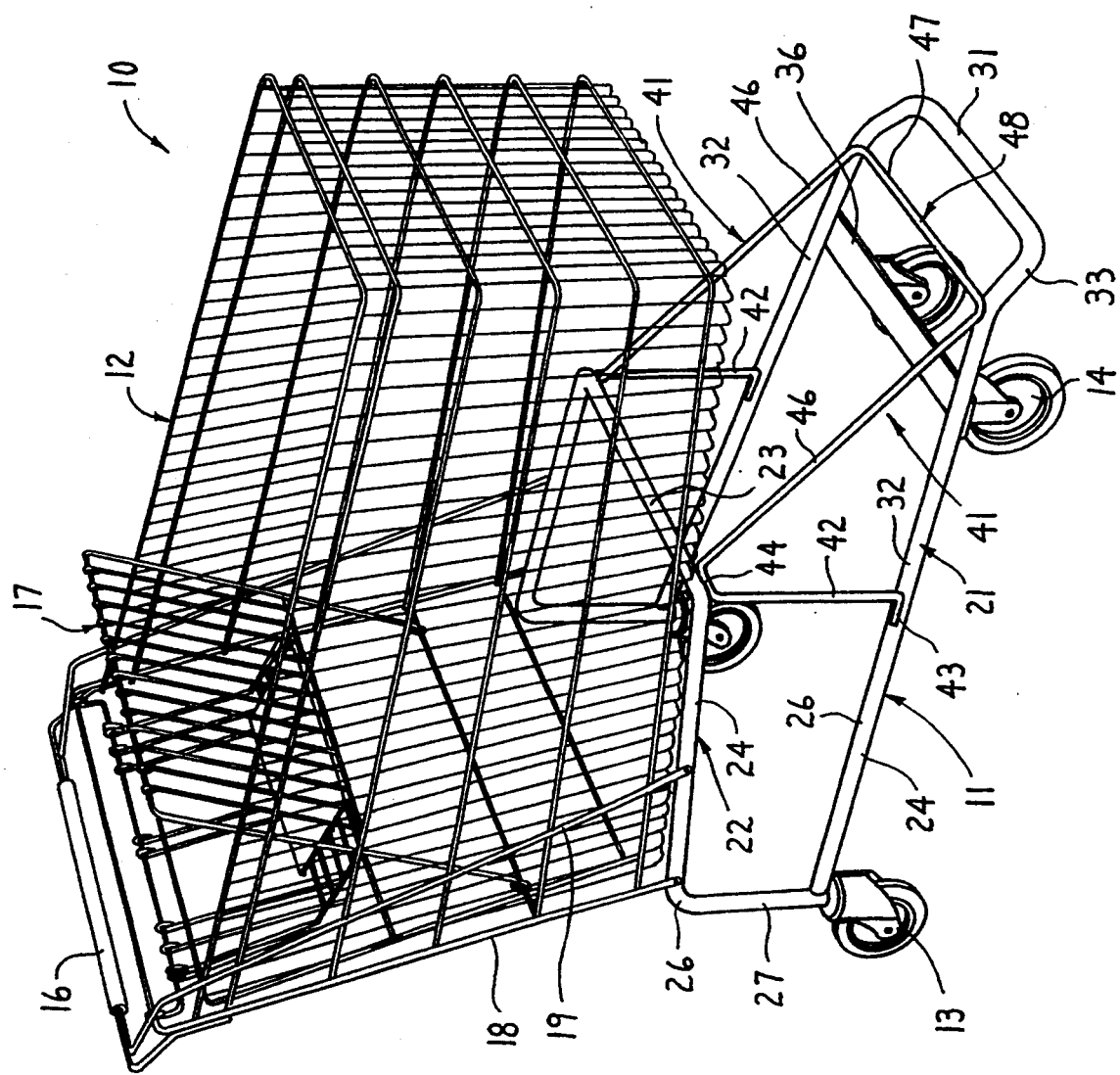
FIG. 1 is a perspective view of a nestable shopping cart provided with the improved base or underframe of this invention.
Figure 2:
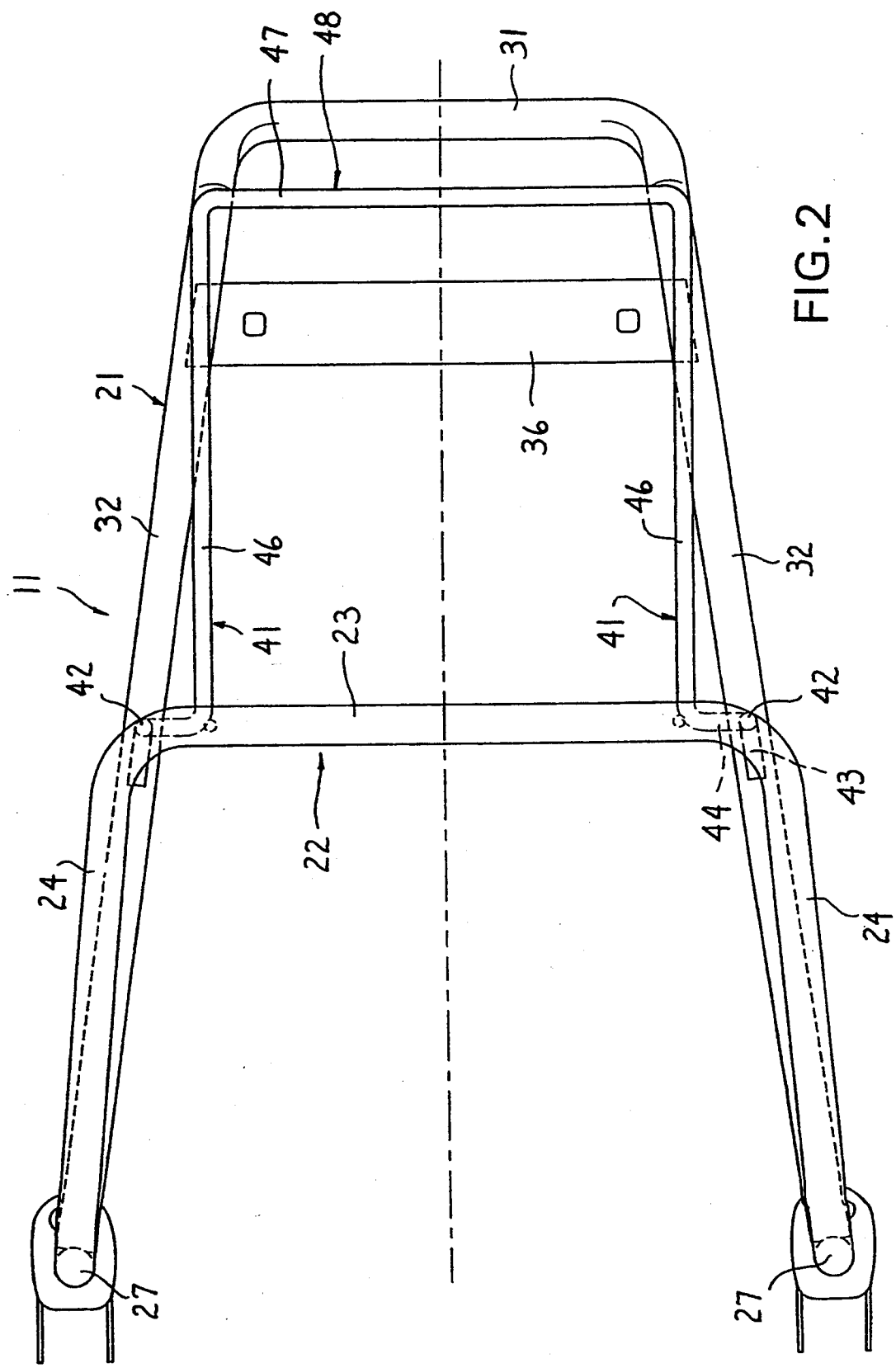
FIG. 2 is a top plan view of the base.
Figure 3:
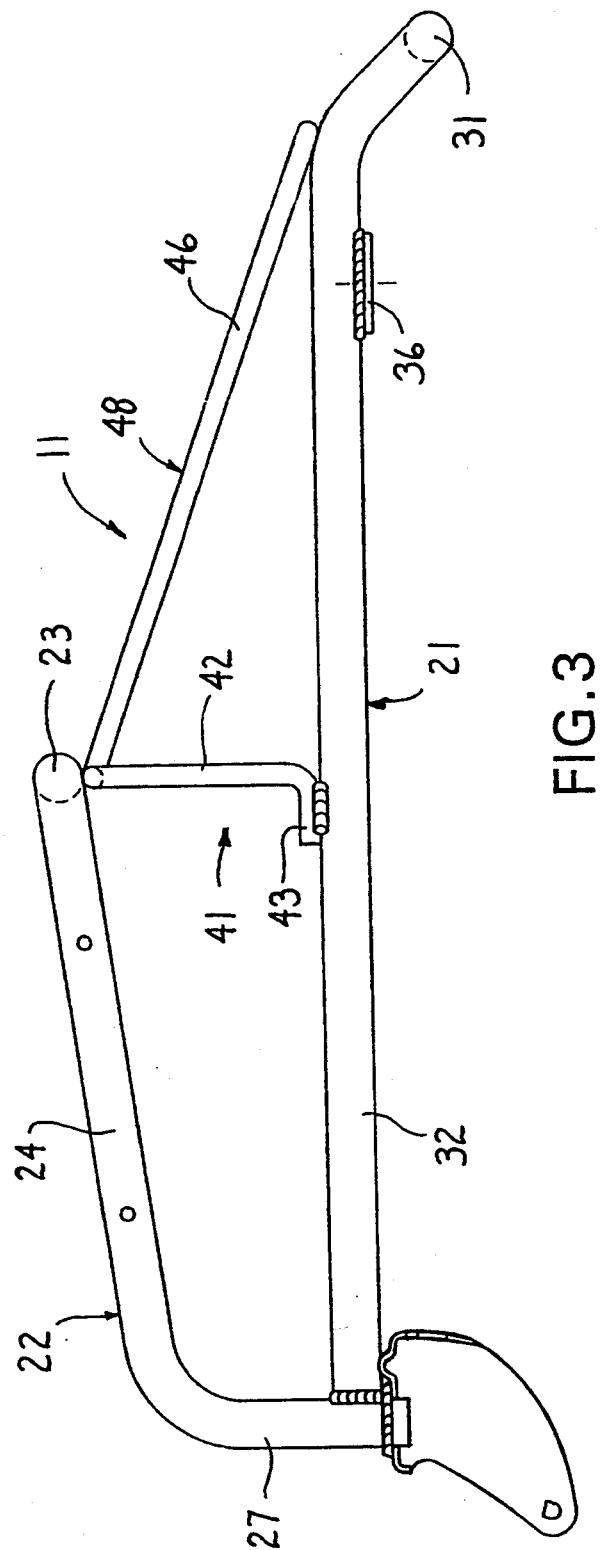
FIG. 3 is a side elevational view of the base shown in FIG. 2.

In the following description, certain terminology will be used for convenience in reference only, and will not be limiting. For example, the words "upwardly", "downwardly", "rightwardly" and "leftwardly" will refer to directions in the drawings to which reference is made. The words "front" and "rear" will also be used to designate the normal direction of use of the cart by an individual, with "front" being the rightward end in FIG. 1 and "rear" being the leftward end in FIG. 1. The words "inwardly" and "outwardly" will refer to directions toward and away from, respectively, the geometric center of the cart and designated parts thereof. Said terminology will include the words specifically mentioned, derivatives thereof, and words of similar import.

DETAILED DESCRIPTION

Referring to the drawings, FIG. 1 illustrates a preferred embodiment of a nestable shopping cart 10 embodying the improved anti-storage base or underframe 11 of this invention. The cart 10 includes a conventional wire basket 12 fixedly seated atop the base 11, which base is equipped with a pair of rear wheel assemblies 13 and a pair of front caster assemblies 14. The basket 12 is of generally conventional construction and includes a handle 16 at the rear end thereof and a collapsible baby seat assembly 17 which cooperates with the rear or end wall of the basket. The basket is of a generally diverging configuration as it projects from the front end thereof to permit nesting with other like baskets. One or more heavy frame wires 18 and 19 are associated with the basket adjacent the rear sides thereof to permit the basket, in a conventional manner, to be fixedly secured to the base. Alternately, many conventional baskets utilize an elongated mounting plate associated with the lower portion of the basket for securing same to the base. The overall construction of the base is conventional and, as is well known in the industry, can assume many different shapes and variations.

Considering now the improved base 11, same is formed by two principle U-shaped tubular steel members, the first being the base frame member designated generally at 21, and the second being the basket support member designated generally at 22. These two U-shaped members 21 and 22 are both conventional, but are briefly described below for completeness of illustration and understanding.

More specifically, the U-shaped member 22 functions primarily as a planar support for the basket 11 and, for this purpose, includes a bight 23 which extends transversely beneath the bottom of the basket at a location spaced forwardly from the rear end thereof, although this bight is also spaced rearwardly a significant distance from the forward end of the basket. The bight 23 extends between and integrally joins to a pair of identical legs 24 which project rearwardly and slightly downwardly with respect to the horizontal. The legs 24 are integrally joined to the opposite ends of the bight 23, such as by means of approximate 90° bends. The legs 24 and bight 23 define a generally planar support for the basket, which planar support is inclined slightly downwardly as it projects rearwardly as is conventional to permit nesting of the baskets of like carts. The legs 24 generally diverge outwardly at a slight angle as they project rearwardly to facilitate cart nesting and are integrally joined, as by substantially 90° bends 26, to rear legs or uprights 27 which project substantially vertically downwardly and have the lower free ends thereof fixedly joined to the rear wheel assemblies 13.

As to the U-shaped tubular member 21 which defines the base frame, it has a transversely extending bight 31 which is located at the toe or forward end of the cart. The bight 31 is spaced downwardly a substantial distance below the front end of the basket, and is spaced slightly upwardly from the floor by the front casters. This U member 21 also includes a pair of elongate side legs 32 which are joined through approximately 90° bends to opposite ends of the bight 31 and then project generally horizontally rearwardly for rigid connection to the lower ends of the rear legs 27 adjacent the rear wheels. These elongate side legs 32 also typically diverge outwardly at a slight angle as they project rearwardly to facilitate cart nesting.

In the illustrated cart, the base side legs 32 have short front portions 33 which are angled downwardly, with the front ends of these angled portions being joined to opposite ends of the bight 31. This is a conventional configuration for the U-shaped base member 21, although it will be recognized that the downwardly angled front portions 33 can be eliminated if desired so that the entire member 21 is substantially in the same plane.

The base frame member 21 also mounts thereon a front caster plate 36, the latter being positioned adjacent but somewhat rearwardly from the bight 31 and extending transversely between and fixedly secured to the elongate side legs 32. This front caster plate 36 is provided in a conventional manner so as to mount the front casters 14 thereon.

The construction of the base 11 and specifically the construction of the U-shaped members 21 and 22, as described above, is conventional and is commonly utilized on shopping carts.

According to the improved base 11 of this invention, to prevent storage of merchandise on the base below the basket, and to at the same time provide reinforcement for the cantilevered basket, the base 11 is provided with substantially identical storage-preventing trusses 41 which are provided adjacent opposite sides of the base and structurally interconnect the U-shaped base frame member 21 to the cantilevered U-shaped basket support member 22. These storage-preventing trusses 41 are each disposed so as to be positioned generally under opposite sides of the basket 12, and are rigidly and permanently joined between the U-shaped members 21 and 22 to provide for rigidification thereof.

The truss 41 includes a generally upright leg or brace 42 which is positioned generally directly over the base side leg 32 and projects vertically upwardly and has its upper end rigidly joined, as by welding, to the basket support bight 23 adjacent one end thereof. The lower end of the upright brace 42 has a short securing leg 43 which is bent generally perpendicularly from the upright leg and directly overlies the side leg 32 in generally parallel relationship therewith. This securing leg 43 is fixedly secured, as by welding, to the side leg 32.

The upper end of the upright brace 42 also has a short securing leg 44 which is bent generally transversely so as to project generally horizontally to directly underlie the basket supporting bight 23, which short securing leg 44 is fixedly secured, as by welding, to the bight 23 to fixedly and rigidly join the upright brace 42 between the upper cantilevered U member 22 and the side leg 32 of the lower U member 21. The upper and lower securing legs 44 and 43, respectively, are bent from the main leg or brace 42 so as to extend in substantially perpendicular directions which are approximately horizontal.

The storage-preventing truss 41 also includes an angled storage-preventing leg or brace 46 which is fixedly joined to the basket supporting bight 23 and which then projects forwardly and angles downwardly for rigid connection to the respective side leg 32 in the vicinity of the front bight 31 of the base frame. This angled storage-preventing brace 46 has the rearward end thereof integrally joined to one end of the top securing leg 44, whereas the other end of this brace 46 overlies and directly contacts the side leg 32 adjacent the front end thereof, which contact region is fixedly secured, as by welding.

The two trusses 41 are substantially identical except for being mirror images of one another. Each truss 41 is preferably formed, as by being bent, from an elongate piece of steel rod so as to be of a one-piece construction, with the truss member being of a generally inverted V-shaped configuration when viewed from the side of the cart.

In the illustrated and preferred embodiment, the lower front end of the angled braces 46 are integrally joined together by a bight 47 which extends transversely across the base and is fixedly joined, as by bends, to the front ends of the angled braces 46. This bight 47 is disposed in close proximity to the front bight 31 of the U-shaped base member 21. The two trusses 41 and their interconnection by the bight 47 results in the defining of a one-piece U-shaped member 48 which can be economically manufactured and assembled to the base, with this U-shaped member 48 functioning both to support the cantilevered basket support 22 from the side legs 32, and to create an obstruction in the region between the basket and the base which effectively permits the safe deposit of goods on the base due to the manner in which the angled braces 46 obstruct this region. More specifically, the rather steep downward slope of these braces 46, coupled with the wide and entirely open space therebetween, coupled with the absence of any lip or ledge which would function to permit storage of goods on these legs, effectively prevents the depositing of most goods on the base and requires customers to use solely the basket for goods storage.

As is apparent from the attached drawings and as described above, the improved base 11 of this invention is of extreme simplicity, both structurally in terms of individual components, and in terms of the manufacturing and assembling steps required. The base is formed primarily from three U-shaped one-piece members which are suitably bent from elongate rods, the members 21 and 22 being hollow tubular rods, the member 48 typically being a smaller diameter solid metal rod. Further, U-shaped basket support member 22 and U-shaped base frame member 21 are both conventional and are usable not only on standard carts which posses the usual base tray for goods storage, but are also usable on the cart of this invention which is provided with the storage-preventing brace member 48. Further, the smaller diameter of the rod preferably used for forming the U-shaped brace member 48, and the fact that this brace member 48 is weldedly secured to the members 21 and 22 at six widely-spaced points, greatly facilities the overall assembly of the U members 21, 22 and 48 together without encountering distortion or like problems caused by manufacturing techniques such as bending, welding or the like. At the same time, this U member 48 not only provides a highly desirable storage-preventing function as described above, but also provides a highly desirable vertical load-reinforcing function directly downwardly from the basket support member 22, specifically from the front bight 26 thereof, to the side legs 32 of the base member so as to provide improved strength and rigidly from the base to the basket at its point of cantilevered support. At the same time, the U-shaped truss member 41 does not interfere with the desired and conventional nestability of the cart with other like carts. The base also retains a somewhat more conventional and hence desirable appearance, with the structure and configuration of the base being such as to facilitate maintenance and cleaning thereof.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wheeled, nestable shopping cart, comprising:
    a rigid base assembly;
    pairs of front and rear wheel assemblies mounted on said base assembly adjacent respective front and rear ends thereof and disposed for supportive and rolling engagement with a floor;
    said base assembly including a first one-piece rearwardly-opening U-shaped base member which is disposed close to but maintained in slightly upwardly spaced relation above said floor;
    said U-shaped base member including a front bight which is disposed at and extends transversely across the front end of said base assembly and a pair of generally horizontally elongate side legs which join to opposite ends of said front bight and project rearwardly therefrom in diverging relation to one another;
    said base assembly including a second one-piece rearwardly-opening U-shaped basket support member which is fixed relative to and spaced vertically upwardly above said first U-member, said second U-member including a bight which extends transversely of the base assembly at a location disposed a substantial distance from both front and rear ends of said base assembly, and a pair of side elements which are joined to opposite ends of said last-mentioned bight and project rearwardly toward the rear end;

each of said first and second U-shaped members being formed in one piece by being bent from an elongate tubular metal member;

said base assembly also including a pair of generally parallel and sidewardly spaced rear uprights disposed adjacent the rear end of said base assembly, each said rear upright being fixedly and rigidly joined between a rear end of one said side leg and a rear end of the side element which is positioned generally thereover so that said second U-member is cantilevered forwardly from said uprights;

an upwardly-opening storage basket fixedly mounted on said base assembly, said basket including a bottom wall which is supported on said second U-member with said basket projected upwardly and cantilevered forwardly from said second U-member; and a pair of side storage-preventing trusses disposed adjacent opposite sides of said base assembly and fixedly connected between said first and second U-members for permitting transfer of vertical loads therebetween while effectively preventing storage of goods on said U-shaped base member;

each said truss being an inverted V-shaped one-piece member which is formed in one piece from a single elongate piece of solid metal rod having a cross section substantially smaller than the cross section of the tubular member defining said first and second U-shaped members;

said truss including a first elongate upright brace extending substantially vertically and having an upper end fixed to said second U-member adjacent one end of said bight thereof and a lower free end fixed to said side leg at a location which is spaced forwardly from the rear end of the respective side leg and is disposed substantially directly under the respective one end of the bight of said second U-member, said truss including a second elongate brace having one end fixed to said second U-member adjacent said one end of said bight thereof, said second brace projecting forwardly and being inclined downwardly so that the other end of said second brace is fixed to said side leg in the vicinity of said front bight;

said trusses and said side legs defining a region which extends sidewardly therebetween and which is unobstructed to prevent storage of goods therein, and a region which extends vertically between said inclined second braces and the bottom wall of the basket and which is also unobstructed so that the incline of the second braces prevents storage of goods thereon; and said second U-shaped basket supporting member and said storage basket mounted thereon being supported in upwardly spaced relation from said first U-shaped base member solely by said rear uprights and said inverted V-shaped side trusses.

2. A cart according to claim 1, wherein the forward ends of said second braces are rigidly and integrally joined through bends to a transversely extending bight so that said last-mentioned bight and said pair of side trusses define a third one-piece rearwardly-opening U-shaped member.

3. A cart according to claim 2, wherein each said side truss includes a short sidewardly-extending leg portion which projects generally horizontally and joins the upper end of the vertical brace to the upper end of the inclined brace, said short leg portion being disposed directly under and in abutting contact with and extending generally parallel along the bight of the second U-shaped member and being rigidly secured thereto by welding.

4. A cart according to claim 3, wherein the lower end of the vertical brace includes a short leg portion which is bent generally horizontally from the lower end thereof and which directly overlies and extends generally parallel to the side leg and is fixedly secured thereto by welding.

5. A cart according to claim 1, wherein each said side truss includes a short sidewardly-extending leg portion which projects generally horizontally and joins the upper end of the vertical brace to the upper end of the inclined brace, said short leg portion being disposed directly under and in abutting contact with and extending generally parallel along the bight of the second U-shaped member and being rigidly secured thereto by welding, said short leg portion having opposite ends thereof integrally joined by transverse bends to the upper ends of said first and second braces.

6. A cart according to claim 5, wherein the lower end of the vertical brace includes a short leg portion which is bent generally horizontally from the lower end thereof and which directly overlies and extends generally parallel to the side leg and is fixedly secured thereto by welding.

7. A cart according to claim 5, wherein the lower end of the vertical brace is fixed by welding to said side leg, and wherein the other end of said second brace is fixed by welding to said side leg in the vicinity of said front bight.

8. A cart according to claim 1, wherein the region which extends sidewardly between said side legs and said side trusses, and which extends vertically downwardly therebetween below said basket, is open to prevent storage of goods on the base.

9. A cart according to claim 1, wherein said rear uprights and said vertical first braces extend in substantially parallel relationship.

10. A cart according to claim 1, wherein said second braces extend in generally parallel relationship so that the upper ends thereof are permanently fixedly secured to the bight of said second U-member adjacent the opposite ends thereof, and the lower front ends of said second braces are permanently fixedly secured to said side legs adjacent opposite ends of said front bight, said second braces being free of any other securement to said first and second U-members.

* * * * *